(12) United States Patent
Kneafsey et al.

(10) Patent No.: US 7,408,012 B1
(45) Date of Patent: Aug. 5, 2008

(54) ADHESIVE BONDING SYSTEMS HAVING ADHERENCE TO LOW ENERGY SURFACES

(75) Inventors: Brendan J. Kneafsey, Dublin (IE); Edward P. Scott, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 379 days.

(21) Appl. No.: 11/107,830

(22) Filed: Apr. 18, 2005

(51) Int. Cl.
*C08F 30/08* (2006.01)

(52) U.S. Cl. .......................... 526/279; 526/196; 526/134; 526/141; 428/355 R

(58) Field of Classification Search ................. 526/279, 526/196, 134, 141; 428/355 R
See application file for complete search history.

(56) References Cited

U.S. PATENT DOCUMENTS

| | | | |
|---|---|---|---|
| 3,236,823 A | 2/1966 | Jennes et al. ............... 260/80.5 |
| 3,275,611 A | 9/1966 | Mottus et al. .............. 260/80.5 |
| 3,661,744 A | 5/1972 | Kehr et al. ............. 204/159.14 |
| 3,898,349 A | 8/1975 | Kehr et al. ..................... 427/36 |
| 4,008,340 A | 2/1977 | Kung et al. ................. 426/651 |
| 4,018,851 A | 4/1977 | Baccei ....................... 260/859 |
| 4,092,376 A | 5/1978 | Douek et al. ............... 260/884 |
| 4,215,209 A | 7/1980 | Ray-Chaudhuri et al. ... 526/292 |
| 4,295,909 A | 10/1981 | Baccei ..................... 156/307.3 |
| 4,515,724 A | 5/1985 | Ritter ......................... 260/410 |
| 4,536,546 A | 8/1985 | Briggs ......................... 525/83 |
| 4,638,092 A | 1/1987 | Ritter ............................. 568/1 |
| 4,638,498 A | 1/1987 | Sinniger et al. ............... 377/39 |
| 4,639,498 A | 1/1987 | Ritter ............................ 526/196 |
| 4,676,858 A | 6/1987 | Ritter ....................... 156/307.3 |
| 4,772,530 A | 9/1988 | Gottschalk et al. .......... 430/138 |
| 4,772,541 A | 9/1988 | Gottschalk et al. .......... 430/339 |
| 4,808,638 A | 2/1989 | Steinkraus et al. ............ 522/24 |
| 4,921,921 A | 5/1990 | Ritter ........................ 526/195 |
| 4,942,201 A | 7/1990 | Briggs et al. .................. 525/71 |
| 4,950,581 A | 8/1990 | Koike et al. ................. 430/281 |
| 4,963,220 A | 10/1990 | Bachmann et al. ....... 156/307.3 |
| 5,106,928 A | 4/1992 | Skoultchi et al. ............ 526/196 |
| 5,143,884 A | 9/1992 | Skoultchi et al. ............ 502/160 |
| 5,151,520 A | 9/1992 | Gottschalk et al. .......... 548/110 |
| 5,268,436 A | 12/1993 | Huver et al. ................. 526/216 |
| 5,286,821 A | 2/1994 | Skoultchi ..................... 526/196 |
| 5,310,835 A | 5/1994 | Skoultchi et al. ............ 526/198 |
| 5,376,746 A | 12/1994 | Skoultchi .................... 526/196 |
| 5,539,070 A | 7/1996 | Zharov et al. ................ 526/198 |
| 5,616,796 A | 4/1997 | Pocius et al. ..................... 564/9 |
| 5,621,143 A | 4/1997 | Pocius .............................. 564/8 |
| 5,681,910 A | 10/1997 | Pocius ........................ 526/198 |
| 5,684,102 A | 11/1997 | Pocius et al. ................. 526/198 |
| 5,686,544 A | 11/1997 | Pocius ........................ 526/196 |
| 5,718,977 A | 2/1998 | Pocius ......................... 428/422 |
| 5,795,657 A | 8/1998 | Pocius et al. ................. 428/516 |
| 5,866,631 A | 2/1999 | Nakagawa et al. ........... 523/118 |
| 5,872,197 A | 2/1999 | Deviny ........................ 526/196 |
| 5,883,208 A | 3/1999 | Deviny ........................ 526/198 |
| 5,935,711 A | 8/1999 | Pocius et al. ................. 428/421 |
| 6,110,987 A | 8/2000 | Kamata et al. ................. 522/64 |
| 6,171,700 B1 | 1/2001 | Sugita et al. ................. 428/408 |
| 6,252,023 B1 | 6/2001 | Moren ......................... 526/196 |
| 6,706,831 B2 | 3/2004 | Sonnenschein et al. ..... 526/196 |
| 6,710,145 B2 | 3/2004 | Sonnenschein et al. ..... 526/196 |
| 6,713,578 B2 | 3/2004 | Sonnenschein et al. ..... 526/196 |
| 6,713,579 B2 | 3/2004 | Sonnenschein et al. ..... 526/196 |
| 6,825,298 B2 * | 11/2004 | Sonnenschein et al. ..... 526/196 |
| 2002/0025381 A1 | 2/2002 | Sonnenschein et al. .. 427/372.2 |
| 2002/0028894 A1 | 3/2002 | Sonnenschein et al. ..... 526/198 |
| 2002/0031607 A1 | 3/2002 | Sonnenschein et al. .. 427/372.2 |
| 2002/0033227 A1 | 3/2002 | Sonnenschein et al. .. 156/306.9 |
| 2002/0195453 A1 | 12/2002 | McLeod ...................... 220/562 |
| 2003/0044553 A1 | 3/2003 | Ramanathan et al. ....... 428/35.8 |
| 2003/0047268 A1 | 3/2003 | Korchnak et al. ............. 156/94 |
| 2003/0181911 A1 | 9/2003 | Sonnenschein et al. ..... 526/217 |
| 2004/0094976 A1 | 5/2004 | Cate et al. .................... 293/120 |

FOREIGN PATENT DOCUMENTS

| | | |
|---|---|---|
| EP | 0 078 995 | 10/1982 |
| EP | 0 356 875 | 8/1989 |
| JP | 73 01 8928 | 2/1973 |
| JP | 2000 327 683 | 11/2000 |
| WO | WO 97/17383 | 5/1997 |
| WO | WO 98/17694 | 4/1998 |
| WO | WO 99/64528 | 12/1999 |
| WO | WO 00/56779 | 9/2000 |
| WO | WO 01/32716 | 5/2001 |
| WO | WO 01/32717 A2 | 5/2001 |
| WO | WO 01/44311 | 6/2001 |
| WO | WO 02/34851 | 5/2002 |
| WO | WO 02/34852 | 5/2002 |
| WO | WO 02/34852 A1 * | 5/2002 |
| WO | WO 03/035703 | 5/2003 |
| WO | WO 03/040151 A1 | 5/2003 |
| WO | WO 03/089536 | 10/2003 |
| WO | WO 03/089536 A2 * | 10/2003 |
| WO | WO 2005/044867 | 5/2005 |

OTHER PUBLICATIONS

Roscher, Christof, et al., "Novel Radiation Curable Nanocomposites with Outstanding Material Properties", 322-329 (2002).
Meyer, Torsten, et al., "Radical Grafting Polymerization of Vinylformamide with Functionalized Silica Particles", 725-732 Macromol. Chem. Phys. 204, No. 4, Verlag GmbH&co. KgaA, Weinheim (2003).
Brown, H.C., "Boranes In Organic Chemistry", 433-439, Cornell University Press (1972).
Pelter, A. and Smith, K., "Organic Boron Compounds", 689-708, 728-732, and 773-784, London (1972).
Barton, D. and Ollis, W.D., "Comprehensive Organic Chemistry", vol. 3, Ch. 14, Ed. Jones, D.N., Pergamon Press (1979).

* cited by examiner

*Primary Examiner*—Ling-Siu Choi
(74) *Attorney, Agent, or Firm*—Steven C. Bauman

(57) ABSTRACT

This invention relates to (meth)acrylate-based polymerizable compositions and adhesive systems prepared therefrom, which include a alkylated borohydride or tetraalkyl borane metal or ammonium salt and a polymerizable siloxane. The inventive compositions and adhesive systems are particularly well suited for bonding applications which involve at least one low energy bonding surface, for example, the polyolefins, polyethylene, and polypropylene.

23 Claims, No Drawings

ADHESIVE BONDING SYSTEMS HAVING ADHERENCE TO LOW ENERGY SURFACES

BACKGROUND OF THE INVENTION

1. Field of the Invention

This invention relates to (meth)acrylate-based polymerizable compositions and adhesive systems prepared therefrom, which include alkylated borohydride or tetraalkyl borane metal or ammonium salt and a polymerizable siloxane. The inventive compositions and adhesive systems are particularly well suited for bonding applications, which involve at least one low energy bonding surface, for example, polyolefin surfaces, such as polyethylene and polypropylene.

2. Brief Description of Related Technology

Low energy surfaces such as polyolefins, i.e., polyethylene, polypropylene, polybutene, polyisoprene, and copolymers thereof, are well known to be difficult to bond to each other and to other surfaces using adhesive bonding technology since they have few active bonding sites available at the free surfaces. Low energy surfaces typically have surface energy values of less than 45 mJ/m$^2$, more typically less than 40 mJ/m$^2$, such as less than 35 mJ/m$^2$.

Bonding low energy surfaces by surface pre-treatments such as flame treatments, plasma treatments, oxidation, sputter etching, corona discharge, or primer treatments with a high surface energy material is well known. Such treatments disrupt the bonds at the surface of the low energy material providing sites which are reactive and which can participate in bonding reactions with adhesive materials. However, such surface pre-treatments are usually undesirable, in that they add cost to the process, they are not particularly reproducible in their results, and the effect of the pre-treatments wears off with time so the pre-treated surfaces must be re-pre-treated if they are not bonded within a reasonable period of time.

The chemistry of organic boron compounds has been studied in detail [see e.g. D. Barton and W. D. Ollis, "Comprehensive Organic Chemistry", Vol. 3, Part 14, Pergamon Press (1979) and H. C. Brown, *Boranes in Organic Chemistry*, Cornell University Press, Ithaca, N.Y. (1972)]. The use of organoboranes such as the trialkylboranes including triethylborane and tributylborane for initiating and catalyzing the polymerization of vinyl monomers is well known. However, such organoborane compounds are known to be flammable in air so that the compounds and compositions containing them require special handling and the compositions have poor shelf stability [see e.g. U.S. Pat. No. 3,236,823 (Jennes), and the Background section of U.S. Pat. No. 5,935,711 (Pocius), at col. 2].

Certain boron alkyl compounds and their use as initiators of polymerization are described in U.S. Pat. Nos. 4,515,724, 4,638,092, 4,638,498, 4,676,858 and 4,921,921, each to Ritter.

U.S. Pat. Nos. 5,106,928, 5,143,884, 5,286,821, 5,310,835 and 5,376,746, each disclose a two-part initiator system for acrylic adhesive compositions, in which the first part includes a reportedly stable organoborane amine complex and the second part includes a destabilizer or activator such as an organic acid or an aldehyde.

Japanese Patent Publication No. S48-18928 describes a method for adhering polyolefin or vinyl polymers using an adhesive obtained by adding trialkylboron to a vinyl monomer, with or without vinyl polymer. Examples of trialkylboron include triisopropylboron, tri-n-butylboron, tripropylboron and tri-tert-butylboron.

U.S. Pat. No. 3,275,611 (Mottus) describes a process for polymerizing unsaturated monomers with a catalyst comprising an organoboron compound, a peroxygen compound and an amine complexing agent for the boron compound.

It is well known that the bonding of polyolefin substrates and other low surface energy substrates causes particular difficulties. Attempts have been made to overcome these difficulties by the extensive and expensive substrate surface preparation described above, or by priming the surface with a high surface energy primer. However, it is desired to develop adhesive compositions, which will bond low surface energy substrates without such surface preparation.

U.S. Pat. No. 5,539,070 (Zharov), and U.S. Pat. Nos. 5,616, 796, 5,621,143, 5,681,910, 5,684,102, 5,686,544, 5,718,977, 5,795,657 and the '711 patent describe organoborane amine complexes which can be used in systems that initiate the polymerization of acrylic monomers in compositions useful for bonding low surface energy plastics substrates such as polyethylene, polypropylene and polytetrafluoroethylene.

International Patent Publication No. WO 99/64528 describes low odor polymerizable compositions comprising monomer blends and organoborane amine complex initiators. These systems require the preparation of trialkyl borane amine complexes to achieve the desired performance and shelf stability. The manufacture of such complexes is an undesirably complicated process. Further, the presence of the amines results in cured adhesives that have a tendency to become yellow in color on aging.

International Patent Publication No. WO 01/44311 also describes amine organoborane complex polymerization initiators in bonding compositions for low surface energy substrates.

International Patent Publication No. WO 01/32716 ("PCT '716") acknowledges that while complexes of an organoborane and an amine may be useful in many applications, certain problems may arise due to the use of amine complexing agents in such conventional complexes. For example, when the complexes contain a primary amine, adhesives prepared therefrom may be prone to discoloration, such as yellowing; further, when including reactive diluents, such as aziridines described, for example, in International Patent Publication No. WO 98/17694, in compositions containing the complexes, the diluents may prematurely react with protic amines (i.e., those amines in which a nitrogen atom is bonded to at least one hydrogen atom) in such complexes, prematurely decomplexing the organoborane initiator.

PCT '716 therefore proposes a complex of an organoborane and a complexing agent of at least one hydroxide or alkoxide, particularly a complex represented by the formula

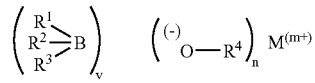

where R$^1$ is an alkyl group having 1 to about 10 carbon atoms; R$^2$ and R$^3$ may be the same or different and are selected from alkyl groups having 1 to about 10 carbon atoms and phenyl-containing groups; the value of "v" is selected so as to provide an effective ratio of oxygen atoms of the alkoxides and/or hydroxides to boron atoms in the complex; each R$^4$ is independently selected from hydrogen or an organic group (e.g., an alkyl or alkylene group); M$^{(m+)}$ represents a countercation [comprising a monovalent cation, such as a Group IA metal (e.g., lithium, sodium and potassium) cation or onium, or a multivalent cation, such as a Group IIA metal (e.g., calcium and magnesium) cation]; n is an integer greater than zero; and m is an integer greater than zero. Particular complexing agents are stated to have a countercation selected from sodium, potassium and tetraalkylammoniums. When any $R^4$ is hydrogen, the complexing agent is said to comprise at least one hydroxide. When any $R^4$ is an organic group, the complexing agent is said to comprise at least one alkoxide.

According to PCT '716, the complexing agent (i.e., the hydroxide or alkoxide) is used in the form of a salt. That is, the complexing agent is stabilized by a suitable countercation such that the complexing agent is capable of complexing the initiator. Thus, in the Formula, $M^{(m+)}$ represents a countercation that stabilizes the complexing agent, not a cation that forms an ionic compound with the organoborane initiator.

PCT '716 states that hydroxides and alkoxides provide strong coupling to organometallic initiators, such as organoboranes, with the resulting complexes having excellent oxidative stability. Thus, complexing agents of at least one hydroxide, alkoxide, or mixtures thereof are said to be particularly beneficial. Such a complex is stated to be a tightly co-coordinated salt formed by association of a Lewis acid (the initiator) and a Lewis base (the hydroxide or alkoxide). This indicates that the oxygen atom of the alkoxide or hydroxide is bonded or co-coordinated to the boron atom of the initiator.

Tetraorganylborate salts of tetraalkylammonium, sodium or lithium are known as photoinitiators in photocurable compositions for imaging materials (see e.g. U.S. Pat. Nos. 4,950,581, 6,110,987 and 6,171,700). Tetraorganylborate salts do not however have a boron-hydrogen bond. The distinction between boron-hydrogen compounds, triorganylboranes and organoborate salts is well illustrated in D. Barton and W. D. Ollis, "Comprehensive Organic Chemistry", to which Chapters 14.2, 14.3 and 14.4 of Vol. 3 are devoted.

More recently, Loctite (R&D) Ltd. has designed and developed technology that is described in International Patent Publication Nos. WO 02/34851, WO 02/34582 and WO 2003/089536 relating generally to polymerizable adhesive compositions with a free radically polymerizable component and an initiator system of an alkyl borohydride with either a metal or ammonium cation. These compositions also describe the use of aziridine components.

And Henkel Corporation together with Loctite (R&D) Ltd. have designed and developed technology, which include a carrier to such polymerizable adhesive compositions so that the compositions have a flash point above 140° F. See International Patent Publication No. WO 03/035703.

The use of aziridines generally however are under regulatory scrutiny, and thus labeling requirements are imposed, which may be an impediment to wide spread usage.

Despite the work of many in this general field of bonding low energy services, there is a need for polymerizable compositions for bonding low surface energy substrates, such as polyolefins, and for end users to have a variety of such compositions which achieve that result through different technical strategies.

SUMMARY OF THE INVENTION

The present invention is directed to a polymerizable composition, which includes a free radical polymerizable component, such as one based on (meth)acrylates, an alkylated borohydride or tetraalkyl borane metal or ammonium salt as defined below, and a polymerizable siloxane. The inventive compositions are particularly useful for bonding low surface energy substrates to a similar or different substrate.

DETAILED DESCRIPTION OF THE INVENTION

For purposes of the present invention, the terms (meth)acrylate and (meth)acrylic are used synonymously with regard to the monomer and monomer-containing component, and these terms include acrylate, methacrylate, acrylic, and methacrylic.

The present invention relates to polymerizable (meth)acrylate compositions and adhesive systems based on such (meth)acrylate compositions, which when applied onto a substrate results in the formation of a polymeric material that strongly adheres to surfaces, particularly low energy surfaces such as polyolefins.

The speed and extent of the polymerization reaction can be controlled by varying the ratio of the various constituents. Adhesive systems of the present invention have shown average bond strengths to low energy surface materials (such as the polyolefins, polyethylene and polypropylene) in excess of about 4 MPas.

The polymerizable compositions disclosed herein are useful for bonding a large range of substrates including metals, plastics and glass to each other, or to different substrates. In addition to polyolefins (such as polyethylene and polypropylene), these low energy surfaces include, for example, acrylonitrile-butadiene-styrene, polytetrafluoroethylene and polycarbonate.

Also disclosed herein are kits comprising the (meth)acrylate compositions for use as adhesive systems, the resultant bonded assembly using the (meth)acrylate based adhesive system of the present invention, and a method of bonding low energy substrates with the (meth)acrylate based adhesive system of the present invention.

The ethylenically unsaturated, free radical polymerizable monomers useful in the present invention preferably comprise addition polymerizable, non-gaseous (boiling point above 100° C. at normal atmospheric pressure), ethylenically-unsaturated organic compounds containing at least one, and preferably at least two, terminal ethylenically unsaturated groups, and being capable of forming a high weight average molecular weight polymer by free radical initiated, chain propagating addition polymerization.

The (meth)acrylate component may be selected from mono (meth)acrylate monomers comprising formula I:

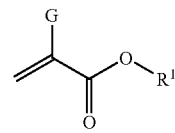

where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, sulfone or tetrahydrafurfuryl, such as citronellyl (meth)acrylates, hydroxylethyl (meth)acrylates, hydroxypropyl (meth)acrylates, tetrahydrodicyclopentadienyl (meth)acrylate, triethylene glycol (meth)acrylates, and tetrahydrafurfuryl (meth)acrylates;

a di- or tri-(meth)acrylate monomers, such as those selected from polyethylene glycol di(meth)acrylates, bisphenol-A di(meth)acrylates, tetrahydrofurane di(meth)acrylates, hexanediol di(meth)acrylates, polythylene glycol di(meth)acrylates, such as triethylene glycol di(meth)acrylate, tripropylene glycol di(meth)acrylate, tetraethylene glycol di(meth)acrylate, diethylene glycol di(meth)acrylate, 1,4-butanediol di(meth)acrylate, 1,6-hexanediol di(meth)acrylate, pentaerythritol tetra(meth)acrylate, trimethylol propane tri(meth)acrylate, trimethylol propane tri(meth)acrylate, di-pentaerythritol monohydroxypenta(meth)acrylate, pentaerythritol tri(meth)acrylate, ethoxylated bisphenol-A di(meth)acrylate, ethoxylated trimethylolpropane tri(meth)acrylates, trimethylolpropane propoxylate tri(meth)acrylates, or combinations thereof;

a di(meth)acrylate ester comprising formula II:

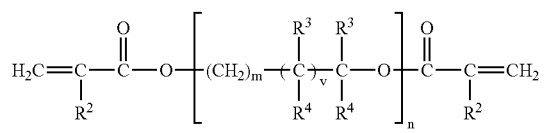

where $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

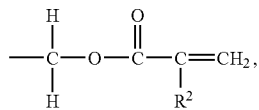

$R^4$ is hydrogen, hydroxy or

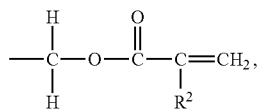

and m is 1 to 8, n is 1 to 20, and v is 0 or 1.

acrylate esters comprising formula III:

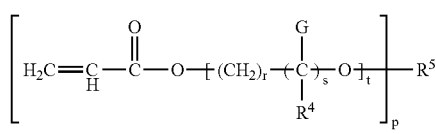

where r is zero or a positive integer, s is zero or 1, t is an integer from 1 to 20, and p is 2, 3 or 4; G and $R^4$ are as defined above; and $R^5$ denotes an organic radical of valency s linked through a carbon atoms or carbon atoms thereof to the indicated t number of oxygen atoms. Preferably, r, s, and t are each 1, G is hydrogen or methyl, and $R^5$ is a hydrocarbon residue of an aliphatic polyhydric alcohol having from 2 to 6 carbon atoms, such as a pentaerythrityl group. A specific example of such compounds is pentaerythritoyl tetrakis (dimethylene glycol acrylate);

(meth)acrylate esters comprising formula IV:

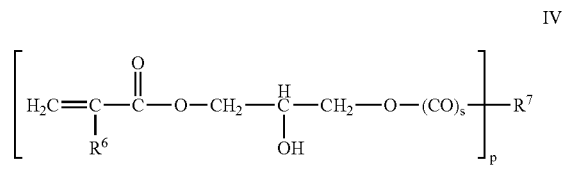

where s and p are as defined above, $R^6$ is hydrogen or methyl, and $R^7$ is an organic radical of valency p, linked through a carbon atom thereof other than the carbon atom of a carbonyl group. More particularly, when s is zero, $R^7$ may denote the residue, containing from 1 to 60 carbon atoms, of an alcohol or phenol having p hydroxyl groups. $R^7$ may thus represent an aromatic, araliphatic, alkaromatic, cycloaliphatic, heterocyclic, or heterocycloaliphatic group, such as an aromatic group containing only one benzene ring, optionally substituted by chlorine, bromine or an alkyl group of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chloride, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae $-C_6H_4C(CH_3)_2C_6H_4-$, in which case p is 2, and $-C_6H_4(CH_2C_6H_3-)_w-CH_2C_6H_4-$, where w is 1 or 2, in which case p is 3 or 4, and the aliphatic groups of formula $-CH_2CHCH_2-$ or $-CH_2CH(CH_2)_3CH_2-$, in which case p is 3, or of formula $-(CH_2)_4-$, $-CH_2CH=CHCH_2-$, $-CH_2CH_2OCH_2CH_2-$, or $-(CH_2CH_2O)_2CH_2CH_2-$, in which case p is 2. When s is 1, $R^7$ may represent the residue, containing from 1 to 60 carbon atoms, of an acid having p carboxyl groups, preferably a saturated or ethylenically unsaturated, straight chain or branched aliphatic hydrocarbon group of from 1 to 20 carbon atoms, which may be substituted by chlorine atoms and which may be interrupted by ether oxygen atoms and/or by carbonyloxy ($-COO-$) groups, or a saturated or ethylenically unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms which may be substituted by chlorine or bromine atoms.

Further preferred compounds where s is 1 include those in which $R^7$ represents a saturated or ethylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms. Specific examples of these carboxylic acid residues are those of formula $-CH_2CH_2-$, $CH=CH-$, and $-C_6H_4-$ where p is 2. Specific examples of suitable compounds of the preceding formula are epoxy acrylates such as 1,4-bis(2-hydroxy-3(acryloyloxy)propoxy) butane, poly(2-hydroxy-3-(acryloyloxy)propyl)ethers of bis (4-hydroxyphenyl)methane (bisphenol F), 2,2-bis(4-hydroxyphenyl)propane (bisphenol A) and phenol-formaldehyde novolaks, bis(2-hydroxy-3-acryloyloxypropyl) adipate and the methacryloyloxy analogues of these compounds;

urethane acrylates and ureido acrylates comprising formula V:

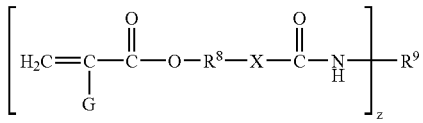

where G is as defined above, $R^8$ denotes a divalent aliphatic, cycloaliphatic, aromatic, or araliphatic group, bound through a carbon atom or carbon atoms thereof indicated at the —O— atom and —X— atom or group, X denotes —O—, —NH—, or —N(alkyl)-, in which the alkyl radical has from 1 to 8 carbon atoms, z is an integer of at least 2 and at most 6, and $R^9$ denotes a z-valent cycloaliphatic, aromatic, or araliphatic group bound through a carbon atom or carbon atoms thereof to the indicate NH groups. Preferably $R^8$ denotes a divalent aliphatic group of 2 to 6 carbon atoms and $R^9$ denotes one of a divalent aliphatic group of 2 to 10 carbon atoms, such as a group of formula: —$(CH_2)_6$—, $CH_2C(CH_3)_2CH_2CH(CH_2)$—, or —$CH_2CH(CH_3)CH_2C(CH_3)_2CH_2)_2$—; or a phenylene group, optionally substituted by a methyl group or a chlorine atom; a naphthylene group; a group of formula: —$C_6H_4C_6H_4$—, —$C_6H_4CH_2C_6H_4$—, or —$C_6H_4C(CH_3)_2C_6H_4$—; or a mononuclear alkylcycloalkylene or alkylcycloalkylalkylene group, such as a methylcyclohex-2,4-ylene, methylcyclohex-2,6-ylene, or 1,3,3-trimethylcyclohex-5-ylenemethyl group. Specific examples include 2,4- and 2,6-(bis(2-acryloyloxyethoxy carbonamido) toluene and the corresponding methacryloyloxy compounds.

The alkylated borohydride and tetraalkyl borane metal or ammonium salt used as initiators of polymerization comprise formula VI:

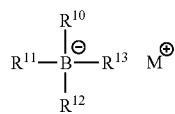

where
$R^{10}$ is $C_1$-$C_{10}$ alkyl, straight chain or branched,
$R^{11}$ and $R^{12}$, which may be the same or different, are H, D, $C_1$-$C_{10}$ alkyl or $C_3$-$C_{10}$ cycloalkyl, phenyl, or phenyl-substituted $C_1$-$C_{10}$ alkyl or $C_3$-$C_{10}$ cycloalkyl, provided that any two or $R^{10}$-$R^{12}$ may optionally be part of a carbocyclic ring,
$R^{13}$ is H, D or $C_1$-$C_{10}$ alkyl, and
$M^+$ is a metal ion or a quaternary ammonium ion comprising formula VII.

The metal ion may be an alkali metal ion such as lithium, sodium, potassium, or cesium, particularly lithium, sodium or potassium, although metallic elements in the second row of the Periodic Table such as barium, magnesium or calcium may be useable, as may transition metals such as copper, iron or cobalt.

The quaternary ammonium ion comprise formula VII below:

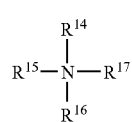

where $R^{14}$-$R^{17}$, which may be the same or different, are $C_1$-$C_{10}$ alkyl, $C_2$-$C_{10}$ alkenyl, $C_3$-$C_{10}$ cycloalkyl, aryl, $C_1$-$C_{10}$ alkylaryl, aryl $C_1$-$C_{10}$ alkyl or aryl $C_1$-$C_{10}$ cycloalkyl, provided that any two of $R^{14}$-$R^{17}$ may be part of an optionally unsaturated carbocyclic ring. Aryl is suitably optionally substituted phenyl, wherein the phenyl ring may be substituted, for example with $C_1$-$C_{10}$ alkyl, particularly $C_1$-$C_6$ alkyl, or halo, particularly Cl, Br or F. Examples of a quaternary ammonium cation include a tetra $C_1$-$C_{10}$ alkylammonium cation, particularly a tetra $C_1$-$C_5$ alkylammonium cation, for example tetramethylammonium, tetraethylammonium or tetra-n-butylammonium, or a tri $C_1$-$C_{10}$ alkylarylammonium cation wherein aryl is phenyl, substituted phenyl (with phenyl being substituted as above), or phenyl-substituted $C_1$-$C_{10}$ alkyl or $C_3$-$C_{10}$ cycloalkyl. Tetramethylammonium cation (i.e., where $R^{14}$-$R^{17}$ in formula VII are each $C_1$ alkyl) is particularly suitable.

In one aspect therefore the invention relates to the use of initiators comprising formula VIII below:

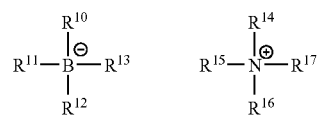

where $R^{10}$-$R^{17}$ are as defined above.

An alkyl group may suitably have 1-6 carbon atoms, for instance 2-4 carbon atoms, and may be straight chain or branched, provided a suitable number of carbon atoms are available for branching. A carbocyclic ring may be bridged by the boron atom.

Suitably at least two, and desirably three, and in some instances four, or $R^{10}$-$R^{13}$ are $C_1$-$C_{10}$ alkyl.

Preferably the alkylated borohydride is of formula VI; M is an alkali metal ion such as lithium, sodium, potassium, or cesium, particularly lithium, sodium or potassium, although metallic elements in the second row of the Periodic Table such as barium, magnesium or calcium may be useable, as may transition metals such as copper, iron or cobalt; $R^{10}$-$R^{12}$ may suitably be the same or different alkyl group and each may suitably be a $C_1$-$C_6$ alkyl group, particularly a $C_2$-$C_4$ alkyl group. Desirably the three alkyl groups $R^{10}$-$R^{12}$ are the same group. A cycloalkyl group may suitably be $C_5$-$C_6$ group.

Examples of suitable metal salts in which $R^1$-$R^3$ are the same alkyl group include lithium triethylborohydride, sodium triethylborohydride, potassium triethylborohydride, lithium tri-sec-butylborohydride, sodium tri-sec-butylborohydride, potassium tri-sec-butylborohydride, lithium trisiamylborohydride, potassium trisiamylborohydride and lithium triethylborodeuteride. A particularly suitable example is lithium tri-sec-butylborohydride.

An example of a compound in which $R^{11}$ is an alkyl group and $R^{10}$ and $R^{12}$ are H is lithium thexylborohydride. An example of a compound in which $R^{10}$ and $R^{12}$ form part of a cyclic ring is lithium 9-borabicyclo[3.3.1]-nonane ("9BBN") hydride.

Desirably at least one of $R^{11}$ and $R^{12}$ is a $C_1$-$C_{10}$ alkyl group or phenyl, provided that not more than one of $R^{11}$ and $R^{12}$ is phenyl. It will be understood by those skilled in the art that a phenyl group may be substituted in the ring by one or more substituents, which do not affect the activity of the compound of formulae VI or VII as a polymerization initiator. Such ring-substituents include $C_1$-$C_{10}$ alkyl, for example $C_1$-$C_6$ alkyl, particularly methyl.

The above-identified compounds are commercially available from various suppliers such as Aldrich Chemical Co., e.g., under tradenames such as Super-hydride, Selectride, and Super-deuteride, or BASF Corporation (formerly Callery Chemicals), Evans City, Pa., under the trade name CalSelect. Other suitable compounds include the metal borohydrides analogous to the boron compounds as described in the Ritter patents such as diisopinocamphenylborane, dicyclohexylborane, and diisoamylborane.

The quantity of alkylated borohydride or tetraalkyl borane may suitably be such as to provide 0.01% to 5% by weight, particularly 0.01% to 2% by weight, such as 0.1% to 1% by weight, of boron in the total composition. For ease in handling, the alkylated borohydride or tetraalkyl borane is suitably used in a concentration up to about 1.5M, such as about 1M, although persons of skill in the art may choose another suitable concentration depending upon user preference.

The polymerizable siloxane should be capable of reacting with the polymerizable monomer when initiated by the initiator system. Thus, polymerizable siloxanes suitable for use herein include compositions including (a) a silicone fluid formed as the reaction product of a first silane having at least one hydrolyzable functional group, and a second silane having a (meth)acrylic functional group and at least one hydrolyzable functional group; (b) a (meth)acrylate monomer; and (c) polymerization inhibitor. See U.S. Pat. No. 5,605,999 (Chu) and U.S. Pat. No. 6,635,546 (Rich), the disclosures of each of which are hereby expressly incorporated herein by reference.

More specifically, polymerizable siloxanes embraced by the above decsption from the '999 and '546 patents include polymerizable siloxanes formed from (i) at least one silane within the formula $R^1_m R^2_p Si(X)_{4-(m+p)}$ A, where $R^1$ is a (meth)acrylate functional group or a hydrolyzable group, and $R^2$ may be the same or different and may be selected from monovalent ethylenically unsaturated radicals, hydrogen, $C_{1-12}$ alkyl, $C_{6-12}$ aryl, $C_{7-18}$ alkylaryl, or a hydrolyzable group, X is a hydrolyzable group, m is an integer from 1 to 3, and m+p is an integer from 1 to 3;

(ii) at least one silane within the formula $R^3_q Si(X)_{4-q}$ B, where $R^3$ may be the same as or different from $R^2$ above and may be selected from monovalent ethylenically unsaturated radicals, hydrogen, $C_{1-12}$ alkyl, $C_{6-12}$ aryl, and $C_{7-18}$ alkylaryl, and q is an integer from 1 to 3, reacted with at least another silane within the formula of $R^4_r R^5_s Si(X)_{4-(r+s)}$ C, where $R^4$ and $R^5$ may be the same or different and may be selected from monovalent ethylenically unsaturated radicals, hydrogen, $C_{1-12}$ alkyl, $C_{6-12}$ aryl, $C_{7-18}$ alkylaryl, r is an integer from 1 to 3, and r+s is an integer from 1 to 3, provided the silicone resin formed contains at least some hydrolyzable group, X; and combinations thereof.

The polymerizable siloxane thus may have (meth)acrylate functionality, like methacryloxypropyl, with (meth)acrylate, (meth)acryloxyalkyldialkoxysilyl and/or (meth)acryloxy-alkyldiaryloxysilyl groups on the polyorganosiloxane, such as at the terminal ends. Desirably, the (meth)acryloxyalkyl-dialkoxysilyl group should be a (meth)acryloxypropyldimethoxysilyl group.

For instance, the polyorganosiloxane may be selected from compounds within formula V below:

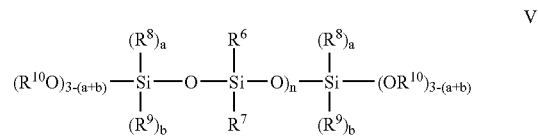

V where $R^6$, $R^7$, $R^8$ and $R^9$ may be the same or different and are alkyl, alkenyl, aryl, (meth)acryl, and the like, provided that at least one of $R^6$, $R^7$, $R^8$ and $R^9$ is (meth)acryl, having up to 10 carbon atoms ($C_{1-10}$), or substituted versions thereof, such as halo- or cyano-substituted; $R^{10}$ is alkyl having up to 10 carbon atoms ($C_{1-10}$); n is an integer between about 100 and 1,200; a is 1 or 2; b is 0, 1 or 2; and a+b is 1, 2 or 3.

It is particularly desirable to have polyorganosiloxanes, where $R^6$ and $R^7$ are methyl, $R^8$ is (meth)acrylate; $R^9$ and $R^{10}$ is alkyl, such as methyl, and n is an integer between about 100 and 1,200, inclusive.

Generally, it is convenient to use a linear polyorganosiloxane having (meth)acrylate groups terminating the silicone. Such (meth)acrylate-terminated silicones may be represented by the formula VI below:

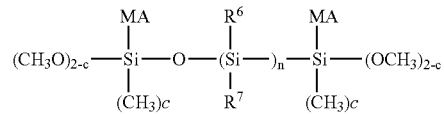

where $R^6$ and $R^7$ are as defined above, MA is (meth)acrylate and c is 0, 1 or 2.

Silicone resins with a structure represented generally by $(R_3SiO_{1/2})_w(R_2SiO_{2/2})_x(RSiO_{3/2})_y(SiO_{4/2})_z$, where a portion of the total R content includes (meth)acrylate functionality, may also be used herein. Desirably, and in the aspect of the invention where at least two silanes form a reaction product, the total (meth)acrylate containing silicon functionality on the silicone resin may be up to about 15 mole % of the silicone resin, such as in the range of about 1 mole % to about 10 mole %, for instance about 4 mole % to about 8 mole %.

Silicone resins may be formed from at least one silane within the formula $R^1_m R^2_p Si(X)_{4-(m+p)}$ I, where $R^1$ is a (meth)acrylate functional group or a hydrolyzable group, and $R^2$ may be the same or different and may be selected from monovalent ethylenically unsaturated radicals, hydrogen, $C_{1-12}$ alkyl, $C_{6-12}$ aryl, $C_{7-18}$ arylalkyl, $C_{7-18}$ alkylaryl, or a hydrolyzable group, X is a hydrolyzable functionality, m is an integer of from 1 to 3 and m+p is an integer from 1 to 3, or as reaction products of that at least one silane and at least one second silane within the formula $R_n Si(X)_{4-n}$ II, where R may be the same or different and may be selected from monovalent ethylenically unsaturated radicals, hydrogen, $C_{1-12}$ alkyl, $C_{6-12}$ aryl, $C_{7-18}$ arylalkyl, $C_{7-18}$ alkylaryl, haloalkyl, and haloaryl, X is a hydrolyzable functionality, and n is an integer of from 0 to 3. Certain of these moieties ordinarily may be reaction products of halogenated trialkylsilanes, tetraalkoxysilanes and (meth)acrylate substituted trialkoxysilanes.

In the compositions of the present invention, the hydrolyzable functionality in the silanes may be any functionality which, when attached to a silicon atom through a Si—O, Si-halo, Si—N or Si—S bond, is readily hydrolyzable in the presence of water. Examples of such functionality include, but are not limited to, halogen (meth)acryloxy, alkoxy, aryloxy, isocyanato, amino, acetoxy, oximinoxy, aminoxy, amidato and alkenyloxy.

In the compositions of the present invention, R may be chosen from $C_{1-12}$ alkyl, $C_{6-12}$ aryl, alkenyl, (meth)acryloxyalkyl and vinyl. In such instances, when R is $C_{1-12}$ alkyl or $C_{6-12}$ aryl, examples of the first silane include, but are not limited to, (meth)acryloxypropyl trimethoxysilane, (meth)acryloxypropyl trichlorosilane, (meth)acryloxypropyl dimethylchloro silane, (meth)acryloxymethyl dichlorosilane and (meth)acryloxymethyldimethyl acryloxysilane.

When $R^1$ on the other silane is chosen from $C_{1-12}$ alkyl, $C_{6-12}$ aryl, the other silane itself may be dimethylchlorosilane, phenyltrichlorosilane, tetrachlorosilane, trimethylchlorosilane, trimethylmethoxysilane, dimethyldimethoxysilane, phenyltrimethoxysilane and tetraethoxysilane.

Of course, appropriate combinations of the first silane may be used as the first silane component; likewise appropriate combinations of the other silane(s) may be used as the other silane component.

Other polymerizable siloxanes are those available commercially from Gelest Inc., such as acryloxy terminated ethyleneoxide dimethylsiloxane-ethyleneoxide ABA block copolymer, 80-120cs, under tradename DBE-U12, acryloxy terminated ethyleneoxide dimethylsiloxane-ethyleneoxide ABA block copolymer, 110-150cs, under tradename DBE-U22, methacryloxypropyl terminated polydimethylsiloxane, 1-2cs, under the tradename DMS-R01, 4-6cs (DMS-R05), 8-14 cs (DMS-R11), 50-90 cs (DMS-R18), 125-250 cs (DMS-R22), and 1000 cs (DMS-R31).

The polymerizable siloxane embraces polymers with backbones such as acrylic, urethane, siloxane, and polyester, provided that when the silane is a siloxane, the backbone does not contain pendant polymerizable groups. Examples include monoamino siloxanes, diamino siloxanes and polyamino siloxanes, provided none of the amino siloxanes have pendant functional groups capable of polymerization.

The polymerizable siloxane may also include the commercially available ones—GP-478 and GP-446—from Genesee Polymers Corporation, Flint, Mich. set forth below:

GP-478

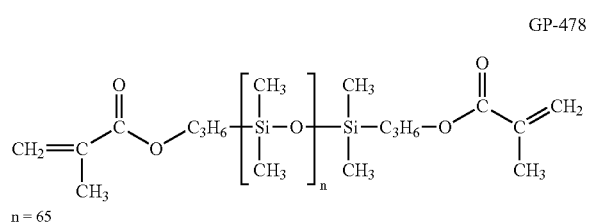

n = 65

GP-446

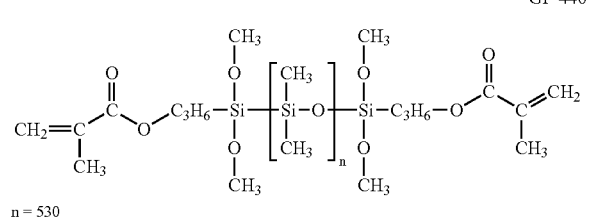

n = 530

The quantity of polymerizable siloxane may suitably be in the range from about 2% to about 50% by weight, for example, 2% to 40% by weight, particularly 2% to 30% by weight, of the total composition.

The alkylated borohydride or tetraaklyl borane metal or ammonium salt and polymerizable siloxane are suitable for packaging together in part B—the initiator component—of a two-part polymerizable composition.

In a further aspect of the invention, there is provided an indication system for use in moderating the cure speed of the adhesive system as well as determining when the cure is complete.

The indicator system is substantially dissolved in the composition, particularly the (meth)acrylate portion thereof (part A), to provide a first color to the (meth)acrylate component, where after mixing with the initiator portion (part B) for a pre-determined amount of time, the composition undergoes a color change as an indication that cure is beginning to occur.

For instance, as reported in H. C. Brown, *Boranes in Organic Chemistry*, Cornell University Press, 433-39 (1972), the disclosure of which being expressly incorporated herein by reference, 5 mole percent iodine inhibits the rate of oxygen absorption by tri-n-butyl borane for 12.5 minutes at 0° C., and tris-(2-methyl-1-pentyl)borane inhibits oxygen absorption for 32 minute. See supra at 435.

The inclusion in the inventive polymerizable composition of the indicator system, such as one based on iodine, provides the ability to control the rate of oxygen absorption which translates into rate of polymerization, as well as the ability to monitor when polymerization is complete, as the indicator system assumes one color initially in the uncured composition and a second color once polymerization is complete.

The polymerizable composition may suitably be a two-part composition in which the free-radically polymerizable monomer component is provided in one part and an alkylated borohydride or tetraaklyl borane metal or ammonium salt is provided in the other part. Alternatively, the alkylated borohydride or tetraaklyl borane metal or ammonium salt may be provided as a primer, where the alkylated borohydride or tetraalkyl borane metal or ammonium salt is applied to a substrate separately from the adhesive composition.

In a still further aspect the invention provides a two-part polymerizable composition, which includes:

part A—(meth)acrylate component, optionally with an acid; and part B—an effective amount of a polymerization initiator comprising an alkylated borohydride or tetraaklyl borane metal or ammonium salt as defined herein, and an polymerizable siloxane, or an polymerizable siloxane capped polymer.

Either part A, part B, or both may further include a toughener, filler and/or thickener, though desirably part A includes a thickener, such as acrylonitrile butadiene rubber, and each of part A and B includes a silica component.

An acid, when added, may be a weak acid, such as having a pKa no lower than about 0.5 with the desirable limit being about 0.9. The upper limit normally is about 13, or less, such as about 11.5. Carboxylic acids, which have a pKa of up to about 8, such as about 6 or about 7, are particularly useful. An effective amount of the acid, is about 0.1 to about 25%, preferably from about 0.1 to about 20%, and more preferably from about 0.5 to about 10% based on a total weight of the (meth)acrylate composition.

Suitable acids may be monobasic or polybasic. Examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid, and saccharin.

Lewis acids may also be used. The acid may also be present as a latent acid, particularly a masked carboxylic acid compound hydrolyzable on contact with moisture, such as an acid anhydride, such as described in European Patent No. EP 356 875 and U.S. Pat. No. 5,268,436, the contents of which are incorporated herein by reference.

While alkylated borohydride or tetraaklyl borane metal or ammonium salts are effective initiators without an acid, the inclusion of an acid (which term includes a latent acid) together with the free radical polymerizable monomer component is desirable. For certain substrates and/or certain polymerization speeds, the presence of an acid may be required. In the case of a two-part composition, the reaction takes place after mixing of the two parts, one containing the alkylated borohydride or tetraaklyl borane metal or ammonium salt and the other containing the acid or other compound reactive therewith.

Moisture is excluded from contact with the alkylated borohydride or tetraaklyl borane metal or ammonium salts until polymerization has been initiated. Suitably, at least part B of the two-part polymerizable composition is packaged in a moisture-free and moisture-impermeable applicator or other container.

Further the invention provides a method for bonding a substrate to a similar or different substrate, where the method comprises applying an adhesive composition as defined above to at least one of the substrates, bringing the substrates together and allowing the composition to cure. In one aspect, the invention provides a method as defined above for bonding a low surface energy substrate, such as a polyolefin substrate, to a similar or different substrate.

In particular the invention provides a method for bonding a substrate, particularly a low surface energy substrate, to a similar or different substrate, where the method includes mixing parts A and B of a two part polymerizable composition prior to use in order to initiate polymerization, applying the mixed composition to at least one of the substrates, bringing the substrates together and allowing the composition to cure by completion of the polymerization initiated on mixing of the parts A and B.

As noted, tougheners may be added. Suitable tougheners include elastomeric materials such as polybutadiene rubbers, polyisoprene, available under the trade name KRATON® from Shell Chemical Corp., Houston, Tex., acrylonitrile butadiene rubber, available under the tradename NIPOL 1072, acrylonitrile-butadiene-styrene ("ABS"), available under the trade name HYCAR®, or as core-shell polymers under the trade name BLENDEX®, or polystyrenes.

For bonding polyolefins, it is desirable to use a core-shell polymer. The use of core-shell polymers in (meth)acrylate compositions is described, for example, in U.S. Pat. Nos. 4,536,546 and 4,942,201, the disclosures of each of which are hereby expressly incorporated therein by reference. Core shell polymers are suitably graft copolymer resins, e.g., ABS graft copolymers, or others described in the '546 and '201 patents, in the form of particles that comprise rubber or rubber-like cores or networks that are surrounded by relatively hard shells. In addition to improving the impact resistance of the bond, core-shell polymers can also impart enhanced spreading and flow properties to the composition. These enhanced properties include a reduced tendency for the composition to leave an undesirable "string" upon dispensing from a syringe-type applicator, or sap or slump after having been applied to a vertical surface. The quantity of toughener, when used, may suitably be in the range from about 1% to about 40%, preferably about 5% to about 25%, based on a total weight of the composition.

Polymeric thickeners may be present in the compositions in an amount up to about 50%, and may be polymers or prepolymers of low or high molecular weight. Suitable polymeric thickeners are a commercially available methacrylate polymer sold under the trademark ELVACITE®, available from E.I. DuPont de Nemours, Wilmington, Del., as well as styrene-methyl methacrylate copolymers, polybisphenol A maleate, or propoxylated bisphenol-A-fumarate polyester sold under the trademark ATLAC®.

Inert fillers, such as finely divided silica, fumed silica (treated or untreated), montmorillonite, clay, bentonite and the like, may also be added. The use of micronized silica can result in a paste-like thixotropic composition. Polymeric thickeners or other thickeners such as silica may suitably be present as a thickener in both parts A and B of a two-part polymerizable composition. Inert fillers such as wood flour, cornstarch, glass fibers, cotton lintners, mica, alumina, silica, teflon and the like may be used to alter physical properties, such as modifying viscosity, improving impact resistance, and the like. Such fillers may be incorporated in the inventive compositions in an amount within the range of from about 0.5% to about 20%, for example about 1% to about 10%, by weight of the composition.

It is a particular advantage of the invention that polyolefin and other low surface energy materials can be used as fillers in the composition. Polyolefin powders such as polyethylene powder are relatively inexpensive. In a composition that readily bonds to a polyolefin, the filler becomes securely adhered into the cured composition. Polyethylene or polypropylene powders can be used with particle sizes in the range from about 0.01 microns to about 1 micron, particularly about 0.02 microns to about 0.3 microns, allowing for a good control of the gap between substrates, i.e., the depth of adhesive. Particularly suitable polyethylene powders are commercially available under the tradename MICROTHENE® available from Equistar Chemicals LP, Houston, Tex. Polyethylene flock and polyolefin chopped fibers can also be used as fillers. The amount of polyolefin filler that may be used in the present invention, is about 0.5% to about 20%, preferably about 1% to about 10% based on a total weight of the composition.

In the two part polymerizable composition of the present invention, parts A and B may be provided in a weight ratio in the range from about 1:10 to 10:1, preferably, about 1:5 to 1:1, more preferably from about 1:2 to 1:1, and even more preferably, from about 8:10 to about 10:8. Advantageously, the two part polymerizable composition is provided in about a 1:1 ratio of parts A and B for simple consumer use.

Commercially available acrylic adhesive compositions for bonding low surface energy substrates, such as 3M's Scotch-Weld™ DP 8005, are currently dispensed in a volume ratio of 1:10 (the volume ratios and weight ratios not being significantly different). It is desirable to be able to dispense a two-part composition in approximately equal volumes of each part. This is easier for the end user and has general appeal from the customer point of view.

The composition may optionally include oxidizing agents, reducing agents, thickeners, non-reactive dyes and pigments, reaction indicators (as noted), fire retarders, stabilizers [such as quinones and hydroquinones, and/or those described and claimed in U.S. Pat. No. 6,552,140 (Kneafsey), the disclosure of which is hereby incorporated herein by reference, for instance nitroxyl free radical stabilizers like 2,2,6,6-tetramethyl-piperidinyloxy ("TEMPO"), and 2,2,5,5-tetramethyl-pyrolyloxy ("PROXYL")], thixotropes, plasticizers and antioxidants. The optional additives are used in an amount that does not significantly adversely affect the polymerization process or the desired properties of polymerization products made thereby.

The invention is more fully illustrated by way of the examples that follow below.

EXAMPLES

Example 1

Initiator Component (Part A)

A lithium triethyl borohydride solution (2 g) (1 molar in tetrahydrofuran) was mixed with trimethylolpropane tris(3-(2-methylaziridino))propionate (2 g) thickened with 5% by weight of a fumed silica (AEROSIL R972) and GP-478 (1 g) (a commercially available methacryloxypropyl end-blocked silicone polymer from Genesee Polymers Corporation).

Adhesive Component (Part B)

A slurry comprising a core-shell toughener (50 g), available commercially under the tradename BLENDEX 336 from GE Speciality Chemicals, tetrahydrofurfuryl methacrylate (125 g), 2-ethylhexyl methacrylate (42 g) and 2-acryloyloxyethyl maleate (34 g) was stirred with a high shear mixer for several hours until a homogeneous dispersion was obtained.

Adhesive Product

The initiator component (part A) (5 g) and adhesive component (part B) (45 g) were packaged respectively into the two syringes of a MIXPAC System 50 1:10 volume ratio 50 ml dual syringe applicator having a 1:10 volume ratio between the syringes holding the parts A and B, respectively. The two components were mixed by the simultaneous extrusion through a 17 stage static mixer nozzle. The mixed adhesive composition was tested on a range of substrates as follows:

Samples of the adhesive were spread onto an untreated test-piece (4×1 inches) (101.6×25.4 mm) to form a film of approximately 0.1 mm in depth, after which a second test-piece was brought against the adhesive to form an overlap adhesive joint with 0.5 inch (12.7 mm) overlap. A clamp was applied to the overlap area and the adhesive joint allowed to cure overnight at room temperature. The bond strengths for bonds assembled using the above procedure were tested on an Instron tester according to ASTM-D1002 and are presented below.

| Shear Strength | Substrates |
|---|---|
| 2.9 MPa | GFPP*/GFPP* |

*GFPP is a commercially available 30% glass filled polypropylene suitable for automotive applications supplied by Stamax

Example 2

Initiator Component (Part A)

A lithium triethyl borohydride solution (2 g) (1 molar in tetrahydrofuran) was mixed with trimethylolpropane tris(3-(2-methylaziridino))propionate (3 g) thickened with 5% by weight of a fumed silica (AEROSIL R972).

Adhesive Component (Part B)

The adhesive component was prepared from the adhesive component (part B) from Example 1 at a 90% by weight level and GP-478 at a 10% by weight level. GP-478 is a commercially available methacryloxypropyl end-blocked silicone polymer from Genesee Polymers Corporation.

Adhesive Product

An adhesive product was prepared and evaluated using the aforementioned initiator components and adhesive components, as in Example 1 above to give the following results.

| Shear Strength | Substrates |
|---|---|
| 2.3 MPa | GFPP/GFPP |

What is claimed is:

1. A polymerizable composition for bonding a low surface energy substrate to a similar or different substrate, comprising:
    a) at least one free-radically polymerizable monomer component,
    b) an effective amount of an initiator system for initiating polymerization of the free-radically polymerizable monomer, said initiator system comprising:
        alkylated borohydride or tetraalkyl borane metal or ammonium salts comprising formula VI below:

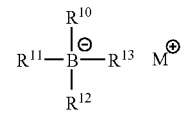

VI wherein $R^{10}$ is $C_1$-$C_{10}$ alkyl,
$R^{11}$ and $R^{12}$, which may be the same or different, are selected from the group consisting of H, D, $C_1$-$C_{10}$ alkyl, $C_3$-$C_{10}$ cycloalkyl, phenyl, phenyl-substituted $C_1$-$C_{10}$ alkyl and phenyl-substituted $C_3$-$C_{10}$ cycloalkyl, provided that any two of $R^{10}$-$R^{12}$ may optionally be part of a carbocyclic ring,
$R^{13}$ is H, D or $C_1$-$C_{10}$ alkyl, and
M⁺ is a metal ion or a quaternary ammonium ion comprising formula VII below

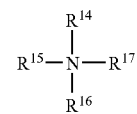

VII wherein $R^{14}$-$R^{17}$, which may be the same or different, are selected from the group consisting of $C_1$-$C_{10}$ alkyl, $C_2$-$C_{10}$ alkenyl, $C_3$-$C_{10}$ cycloalkyl, aryl, $C_1$-$C_{10}$ alkylaryl, aryl $C_1$-$C_{10}$ alkyl and aryl $C_1$-$C_{10}$ cycloalkyl, provided that any two of $R^{14}$-$R^{17}$ may be part of an optionally unsaturated carbocyclic ring; and
    c) a polymerizable siloxane reactive with the free-radically polymerizable monomer component.

2. A composition according to claim 1, which is a two-part composition in which the free-radically polymerizable monomer component is provided in one part and the initiator system is provided in the other part.

3. A composition according to claim 1, wherein three of $R^{10}$-$R^{13}$ of the alkylated borohydride of formula VI are the same $C_1$-$C_{10}$ alkyl group and one of $R^1$-$R^4$ is phenyl or phenyl-substituted $C_1$-$C_{10}$ alkyl.

4. A composition according to claim 1, wherein three of $R^{10}$-$R^{13}$ of the alkylated borohydride of formula VI are the same $C_2$-$C_4$ alkyl group and one of $R^1$-$R^4$ is phenyl.

5. A composition according to claim 1, wherein each of $R^{14}$-$R^{17}$ of the quaternary ammonium ion of formula VII is the same $C_1$-$C_5$ alkyl group.

6. A composition according to claim 1, wherein the initiator system comprises:

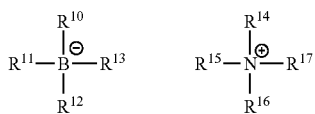

wherein $R^{10}$-$R^{12}$ are each the same $C_1$-$C_6$ alkyl group, $R^{13}$ is phenyl;

$R^{14}$-$R^{17}$ are each the same $C_1$-$C_6$ alkyl group.

7. A composition according to claim 1, wherein the polymerizable siloxane is represented by $(R_3SiO_{1/2})_w(R_2SiO_{2/2})_x(RSiO_{3/2})_y(SiO_{4/2})_z$, wherein a portion of the total R content includes (meth)acrylate functionality.

8. A composition according to claim 1, wherein the polymerizable siloxane is a composition made from (a) a silicon fluid formed as the reaction product of a first silane having at least one hydrolyzable functional group, and a second silane having a (meth)acrylic functional group and at least one hydrolyzable functional group; (b) a (meth)acrylate monomer; and (c) polymerization initiator.

9. A composition according to claim 1, wherein the polymerizable siloxane is a member selected from the group consisting of

GP-478

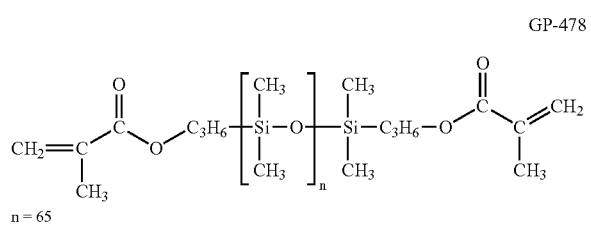

n = 65

GP-446

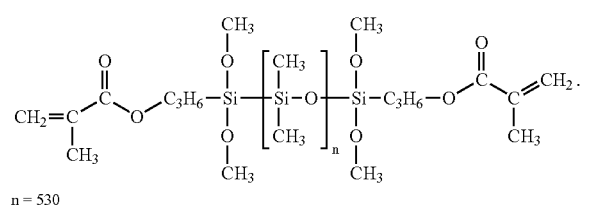

n = 530

10. A composition according to claim 1 further comprising a cure indicator.

11. A composition according to claim 1, wherein the polymerizable siloxane comprises a silicone fluid formed as the reaction product of a first silane having at least one hydrolyzable functional group, and a second silane having a (meth) acrylic functional group and at least one hydrolyzable functional group.

12. A composition according to claim 1, wherein the polymerizable siloxane is formed from (i) at least one silane within the formula $R^1_mR^2_pSi(X)_{4-(m+p)}$ A, wherein $R^1$ is a (meth)acrylate functional group or a hydrolyzable group, and $R^2$ is the same or different and is selected from the group consisting of monovalent ethylenically unsaturated radicals, hydrogen, $C_{1-12}$ alkyl, $C_{6-12}$ aryl, $C_{7-18}$ alkylaryl, and a hydrolyzable group, X is a hydrolyzable group, m is an integer from 1 to 3, and m+p is an integer from 1 to 3; (ii) at least one silane within the formula $R^3_qSi(X)_{4-q}$ B, wherein $R^3$ is the same as or different from $R^2$ above and is selected from the group consisting of monovalent ethylenically unsaturated radicals, hydrogen, $C_{1-12}$ alkyl, $C_{6-12}$ aryl, and $C_{7-18}$ alkylaryl, and q is an integer from 1 to 3, reacted with at least another silane within the formula of $R^4_rR^5_sSi(X)_{4-(r+s)}$ C, wherein $R^4$ and $R^5$ is the same or different and is selected from the group consisting of monovalent ethylenically unsaturated radicals, hydrogen, $C_{1-12}$ alkyl, $C_{6-12}$ aryl, $C_{7-18}$ alkylaryl, r is an integer from 1 to 3, and r+s is an integer from 1 to 3, provided the silicone resin formed contains at least some hydrolyzable group, X; and combinations thereof.

13. A composition according to claim 1, wherein the polymerizable siloxane is selected from compounds within formula V below:

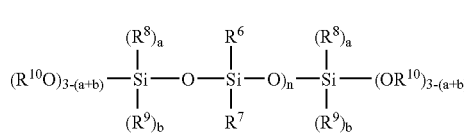

wherein $R^6$, $R^7$, $R^8$ and $R^9$ are the same or different and are selected from the group consisting of alkyl, alkenyl, aryl, and (meth)acryl, provided that at least one of $R^6$, $R^7$, $R^8$ and $R^9$ is (meth)acryl, having up to 10 carbon atoms ($C_{1-10}$), or substituted versions thereof; $R^{10}$ is alkyl having up to 10 carbon atoms; n is an integer between about 100 and 1,200; a is 1 or 2; b is 0, 1 or 2; and a+b is 1, 2 or 3.

14. A composition according to claim 1, wherein the polymerizable siloxane is represented by the formula VI below:

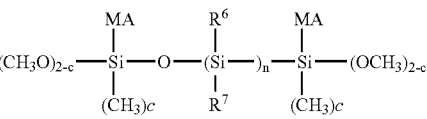

wherein $R^6$ and $R^7$ are the same or different and are selected from the group consisting of alkyl, alkenyl, aryl, and (meth) acryl, provided that at least one of $R^6$ $R^7$ is (meth)acryl, having up to 10 carbon atoms ($C_{1-10}$), or substituted versions thereof, MA is (meth)acrylate and c is 0, 1 or 2.

15. A composition according to claim 1, wherein the polymerizable siloxane is a structure represented by $(R_3SiO_{1/2})_w$ $(R_2SiO_{2/2})_x(RSiO_{3/2})_y(SiO_{4/2})_z$, wherein w+x+y+z=1 and a portion of the total R content includes (meth)acrylate functionality.

16. A composition according to claim 1, wherein the polymerizable siloxane is a member selected from the group consisting of acryloxy terminated ethyleneoxide-dimethylsiloxane-ethyleneoxide ABA block copolymer and and methacryloxypropyl terminated polydimethylsiloxane.

17. A composition according to claim 1, wherein the polymerizable siloxane is present in the range from about 2% to about 50% by weight of the total composition.

18. A composition according to claim 1, wherein the polymerizable siloxane is present in the range from about 2% to about 30% by weight of the total composition.

19. A composite article comprising a first substrate and a second substrate bonded to the first substrate by an acrylic adhesive, wherein the acrylic adhesive comprises the polymerization product of a composition according to claim 1.

20. A cured adhesive composition comprising the polymerization product of a composition according to claim 1.

21. A bonded article comprising two substrates bonded by the polymerization product of a composition according to claim 1.

22. A two-part polymerizable adhesive composition according to claim 1, comprising:
   part A) an effective amount of an initiator system, a polymerizable siloxane, and at least one (meth)acrylate monomer, optionally with one or more of a toughener, filler and thickener, but without any compound that is reactive with the initiator system to free an alkylated borohydride or tetraalkyl borane metal or ammonium salt therefrom; and
   part B) at least one (meth)acrylate monomer together with a compound reactive with an initiator system to free an alkylated borohydride or tetraalkyl borane metal or ammonium salt therefrom and optionally with one or more of a toughener, filler and thickener.

23. A method for bonding together substrates, at least one of which is constructed of a low surface energy material, the steps of which comprise:
   applying a composition according to claim 1 to at least one of the substrates,
   bringing the substrates together with the composition, and allowing the composition to cure.

* * * * *